United States Patent
Kennedy et al.

(10) Patent No.: US 11,617,467 B2
(45) Date of Patent: *Apr. 4, 2023

(54) COMBINED AIR FRYER AND SLOW COOKER LID

(71) Applicant: Sunbeam Products, Inc., Boca Raton, FL (US)

(72) Inventors: William Michael Kennedy, Boca Raton, FL (US); Eddy Fung, Kowloon (HK)

(73) Assignee: Sunbeam Products, Inc., Boca Raton, FL (US)

( * ) Notice: Subject to any disclaimer, the term of this patent is extended or adjusted under 35 U.S.C. 154(b) by 173 days.

This patent is subject to a terminal disclaimer.

(21) Appl. No.: 17/116,320

(22) Filed: Dec. 9, 2020

(65) Prior Publication Data
US 2021/0085120 A1  Mar. 25, 2021

Related U.S. Application Data

(63) Continuation-in-part of application No. 16/827,213, filed on Mar. 23, 2020.

(60) Provisional application No. 62/869,804, filed on Jul. 2, 2019.

(51) Int. Cl.
| A47J 37/06 | (2006.01) |
| A47J 27/086 | (2006.01) |
| A47J 27/08 | (2006.01) |
| A47J 37/12 | (2006.01) |

(52) U.S. Cl.
CPC ............. *A47J 27/086* (2013.01); *A47J 27/08* (2013.01); *A47J 37/0641* (2013.01); *A47J 37/128* (2013.01)

(58) Field of Classification Search
CPC .......... A47J 27/08; A47J 37/06; A47J 37/128; A47J 37/0641; A47J 37/0754
USPC .......... 99/339, 340, 352, 357, 467, 475, 476
See application file for complete search history.

(56) References Cited

U.S. PATENT DOCUMENTS

| 2,523,796 A * | 9/1950 | Weeks ................. A47J 37/0623 |
| | | 219/400 |
| 5,699,722 A * | 12/1997 | Erickson ................... A23L 5/17 |
| | | 126/39 M |
| 2021/0045569 A1* | 2/2021 | Huang .................... A47J 27/09 |

OTHER PUBLICATIONS

Machine Translation of CN-109393957-A, Yang, Mar. 2019 (Year: 2019).*
Machine Translation of CN-208610644-U, Pu, Mar. 2019 (Year: 2019).*

* cited by examiner

*Primary Examiner* — Reginald Alexander
(74) *Attorney, Agent, or Firm* — Husch Blackwell LLP (57) ABSTRACT

The present invention provides a combination pressure cooker and air fryer lid that may be attached to a vessel. The lid may be adjustable between two general cooking positions. In the first cooking position, the lid may operate with the vessel as a pressure cooker. In the second cooking position, the may operate with the vessel as an air fryer. In performing either of the pressure cooking or air fryer cooking functions, the lid need not be replaced.

18 Claims, 7 Drawing Sheets

COMBINED AIR FRYER AND SLOW COOKER LID

CROSS-REFERENCE TO RELATED APPLICATIONS

This Application is a continuation-in-part of U.S. patent application Ser. No. 16/827,213, filed on Mar. 23, 2020, entitled "Combined Air Fryer and Slow Cooker Lid," which claims priority to U.S. Provisional Patent Application Ser. No. 62/869,804, filed on Jul. 2, 2019, entitled "Combined Air Fryer and Slow Cooker with a Single Lid,", the entire disclosures of which are incorporated herein by reference.

FIELD OF THE INVENTION

The invention refers to a kitchen appliance. More specifically, this invention refers to a kitchen appliance that may be used as either a pressure cooker or air fryer, and includes a single vessel and lid.

BACKGROUND OF THE INVENTION

Many consumers keep a wide variety of kitchen appliances that are tailored to carry out particular cooking functions. For example, many consumers have pressure cookers that can be used to steam or cook food in liquid. Such pressure cookers may substantially reduce cook time.

Consumers also may utilize deep fryers or air fryers to make foods such as potato chips, fried chicken, fish, French fries, or pastries. However, air fryers usually use 70-80% less oil than a traditional deep fryer and are thought of as more healthy. As a result, air fryers have become more commonplace in homes over the past several years.

Many consumers view both pressure cookers and air fryers as necessary appliances due to their usefulness and effectiveness. However, both appliances require storage space when not in use. Given the number of other appliances that a consumer may employ and store (e.g., blenders, food processors, hand and stand mixers, rice cookers), kitchens quickly run out of storage space. As a result, consumers may struggle to find storage space for pressure cookers and air fryers.

Because pressure cooking requires an airtight seal between a lid and vessel, and air frying requires airflow between the lid and vessel and ambient air, it is quite difficult for a single appliance to perform both functions. Current "solutions" to this issue on the market make use of two separate lids that can be used with the same vessel. The first lid can perform pressure cooking functions, while the second lid can perform air frying functions. However, this "solution" defeats the purpose of providing an appliance that can perform both functions since a consumer would need to store each of the two lids, which can be quite clumsy and burdensome. In short, storing two lids does not save enough space in the limited storage space most consumers have in their kitchens. It is therefore desirable for a simply constructed appliance to operate as each of a pressure cooker and air fryer, without the need for additional components.

SUMMARY OF THE INVENTION

The present invention provides a combination pressure cooker and air fryer lid that may be attached to a vessel containing a food item. The lid may be adjustable between two general cooking positions. In the first cooking position, the lid may operate with the vessel as a pressure cooker. In the second cooking position, the lid may operate with the vessel as an air fryer. In performing either of the pressure cooking or air fryer cooking functions, the lid need not be replaced.

In the invention, a lid is provided that may be attached to a cooking vessel using a variety of known or foreseeable methods and mechanisms. The lid includes a dial member that may be in mechanical connection with a handle. When the handle is rotated, the dial member may similarly rotate. In a preferred embodiment, when the handle is fully rotated in a clockwise direction, the dial may similarly rotate clockwise, along with a plate member with which the dial is in mechanical connection. In the fully rotated clockwise direction (referred to herein as the first position), clamps in mechanical connection with the dial member via the plate member may be radially inwardly drawn so as to firmly clamp the lid to the cooking vessel.

More particularly, the plate member is preferably provided with a plurality of ramped slots. Pins mechanically connected to the clamps may be positioned and located in the slots such that when the dial member (and thus the slot member) is rotated, the ramped slots pull the pins inwardly, and thus each clamp is pulled radially inwardly via a cam-like effect.

Furthermore, a seal plate may be in mechanical connection with the handle and/or dial member. In pressure cooking mode, panel members preferably cover apertures in the seal plate that would otherwise provide air communication between the vessel and the environment. In the pressure cooking position, the vessel is sealed from the environment.

When the handle and the dial member are fully rotated in the counterclockwise direction, referred to herein as the second position, the slots on the plate member are also rotated, and the pins (and thus the clamps) that previously secured the lid to the vessel are pushed outwardly. This may release the firm attachment between the lid and the vessel created by the clamp members. At the same time, the seal plate's apertures that were previously covered are rotated to expose the apertures such that air communication between the vessel and the environment is created to help facilitate the air frying process.

In a preferred embodiment, a shaft that connects the dial member to the seal plate may be spring-biased. As such, when the lid is in the first, pressure cooking position, the seal plate is biased upwardly to firmly seat the panel members in the apertures of the lid member. Such upward biasing preferably contributes to keeping the vessel airtight for its pressure cooking mode. To transition the lid from its first position to its second position, and enact the mechanical movements described above, the handle may need to be pushed downwardly before being rotated. This overcomes the tension formed from the spring-biased seal plate, unseating the apertures of the lid member from the panel members to allow rotation of the seal plate.

Sensors may be present in the lid that detect when the lid is in its first or second position. The sensors may be in communication with a microcontroller that may instruct the lid to carry out particular functions associated with pressure cooking or air frying, depending on the position of the handle, user input, or both.

In a simplified alternative embodiment, when the appliance functions in an air frying mode or in a conductive cooking mode (i.e., not an air frying mode, such as with pressure cooking, slow cooking, etc., where a heating element not present in the lid cooks the food). The alternatively constructed appliance also only includes one lid, but it need not form an airtight seal when it is not used as a pressure cooker.

The simplified appliance preferably includes a cover that is fixedly attached to an underside of the lid. The cover includes a first cover portion and a second cover portion. The first cover portion may be fixedly attached to an underside of the lid, and it may include apertures that allow for air communication between the vessel and the fan that operates when the appliance is in air frying mode. The second cover portion may be movable (preferably rotatable) relative to the first cover portion. The second cover portion preferably includes apertures that align with the apertures of the first cover portion. That way, when the appliance is in air frying mode, air can communicate between the fan and the vessel via the apertures on both cover portions.

When a user wishes to use the appliance in a conductive cooking mode, he or she may use an activation member, like a tab member or lever, to manually rotate the second cover portion. When the second cover portion is fully rotated, the surface of the second cover portion that does not include the apertures may cover the apertures in the first cover portion. This substantially blocks communication between the air fryer fan and the vessel. In doing so, the second cover portion effectively blocks food particles being cooked in the vessel and/or steam from contacting the fan or otherwise entering the lid to cause damage.

BRIEF DESCRIPTION OF THE DRAWINGS

For a better understanding of the various embodiments of the present invention, reference may be made to the accompanying drawings in which.

While the disclosure is susceptible to various modifications and alternative forms, specific embodiments thereof are shown by way of example in the drawing and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be understood that any dimensions included in the figures are simply provided as examples and dimensions other than those provided therein are also within the scope of the invention.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
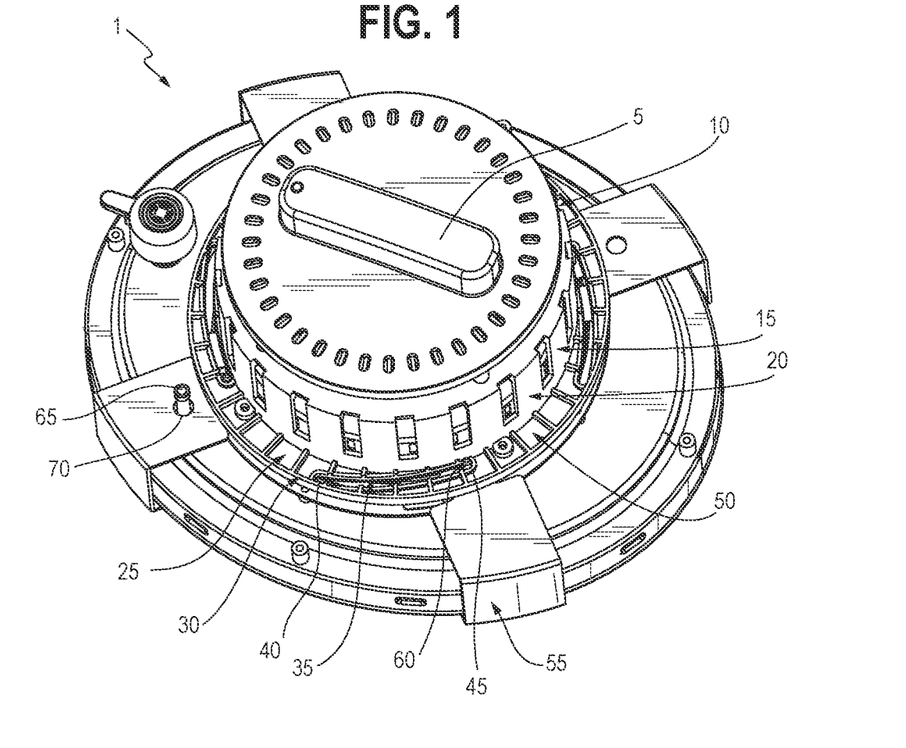
FIG. 1 is a top perspective view of a lid for a combined air fryer and slow cooker constructed according to the teachings of the present invention in a first position.

FIGS. 1-6 depict a lid member 1 that may be used with a vessel (an example of which is provided in FIG. 7) to perform at least two cooking functions. Such cooking functions may be carried out in association with a number of different types of food products. More particularly, the lid member 1 may be selectively attachable to the vessel, and together they may be used as a pressure cooker or an air fryer. As illustrated in FIG. 1, the lid member 1 is shown without a casing. This is to better illustrate the various mechanical components within the lid member 1. In a preferred embodiment, the lid member 1 may include a casing such as those known in the art that may be made from metal, plastic, or the like to give the lid member 1 a more "finished" appearance. Such a casing is illustrated at least in part in FIG. 7, which is described below in greater detail.

As illustrated in FIG. 1, the lid member 1 preferably includes a handle 5 at an upper portion 10 thereof. The handle 5 is preferably in mechanical connection with a circular dial member 15. In the illustrated embodiment, the dial member 15 is circular, but in alternative embodiments, it may take on different shapes so long as it is able to carry out the functions described herein. Moreover, in some embodiments, the handle 5 may not be included, or the dial number 15 may not be included. Similarly, the handle 5 may be provided in a multitude of shapes or sizes, or it may be provided as an alternative activation member like those known in the art such as a knob, button, or otherwise. In any case, the handle 5 and dial member 15, or their alternatives, act as a transmission to actuate movement such as that described below.

At a lower portion 20 of the dial member 15, a plate member 25 is also in mechanical connection with the handle 5, or may be connected to the handle 5 regardless of the dial member 15. As such, when the handle 5 and/or the dial member 15 are rotated, the plate member 25 is similarly rotated. In at least one embodiment, the handle 5, dial member 15, and plate member 25 may be integrally formed. However, in other embodiments, they may be separately constructed and in mechanical connection with one another via known or foreseeable methods and mechanisms.

Near an outer edge 30 of the plate member 25, the plate member 25 may include a plurality of slot members 35. In the embodiment described herein, the plate member 25 includes four slot members 35. However, in alternative embodiments, more or fewer slot members substantially similar to the slot members 35 may be associated with the plate member 25. The slot members 35 may generally be formed as elongated, slightly curved apertures in the plate member 25.

Each slot member 35 preferably includes each of a first end 40 and a second end 45. In a preferred embodiment, the first end 40 is closer to the outer edge 30 of the plate member 25, while the second end 45 is closer to an inner edge 50 of the plate member 25. Between the first end 40 and the second end 45, the aperture formed by the slot member 35 preferably gets closer to the inner edge 50. This creates a ramping, or cam, effect by the slot members 35.

The lid member 1 also preferably includes a plurality of clamp members 55 located along an outer periphery thereof. The clamp members 55 are preferably C-shaped so that they may clamp the lid member 1 to an upper portion of a vessel. The clamp members 55 may be attached to the plate member 25, or in alternative embodiments, to another portion of the dial member 15. The clamp members 55 are preferably attached to the plate member 25 or the dial member 15 in such a manner that allows the clamp members 55 to translate radially inwardly and outwardly so as to get closer to, and farther from, the vessel. As will be described in greater detail herein below, the clamp members 55 are preferably able to translate inwardly or outwardly as the handle 5 and/or dial member 15 is rotated. In the embodiment illustrated herein, the lid member 1 includes four clamp members 55, the same number as slot members 35 that are provided. However, like the slot members 35, in alternative embodiments, more or fewer clamp members 55 may be provided. In the embodiment described herein, the number of clamp members 55 and the number of slot members 35 should be equal to one another.

A pin 60 that is integrally formed with the clamp member 55 preferably projects upwardly therefrom. In operation, each pin 60 is received within a distinct slot member 35. This is preferably true for each clamp member 55, pin 60, and slot member 35 of the lid member 1. As will be described below, it is the rotation of the dial member 15 and its slot members 35 that act as cams on the pin members 60, and in turn the clamp members 55, to radially translate the clamp members 55 inwardly or outwardly to clamp or unclamp the lid member 1 to the vessel.

Figure 3:
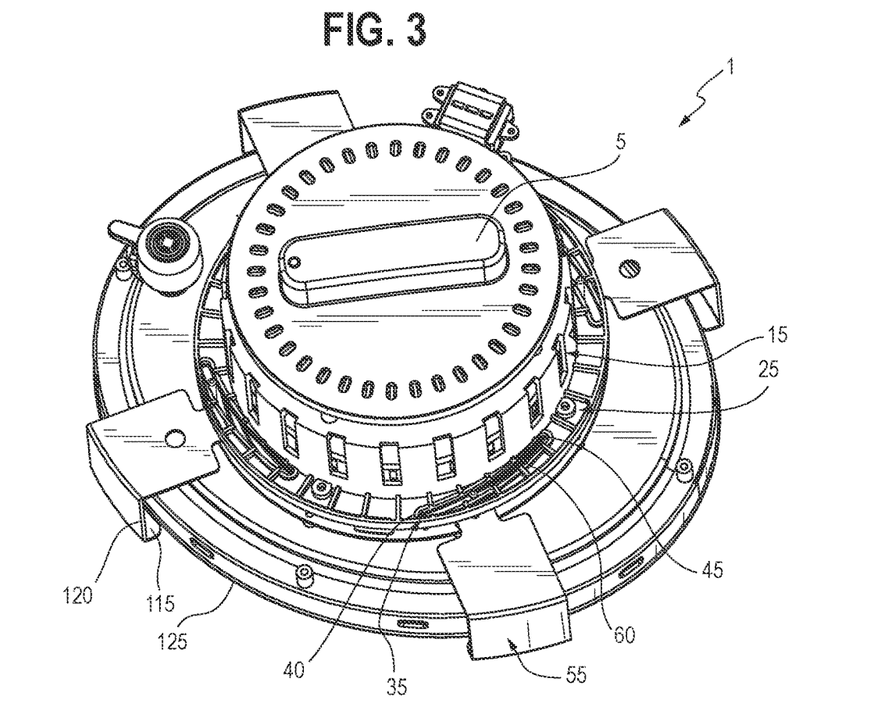
FIG. 3 is a top perspective view of the lid of FIGS. 1 and 2 in a second position.
Figure 5:
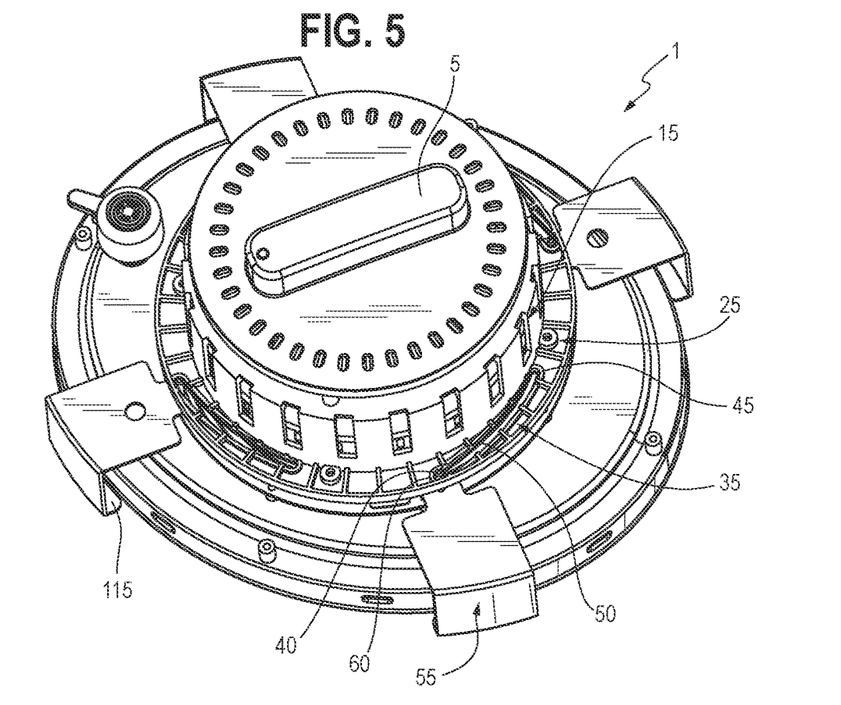
FIG. 5 is a top perspective view of the lid of FIGS. 1-4 in a third position.

With the pin members 60 positioned and located within the slot members 35, rotation of the handle 5, dial member 15, and/or the plate member 25 may cause radial translation of the clamp members 55. As illustrated in FIG. 1, the handle 5, dial member 15, and/or plate member 25 have been rotated completely in the clockwise direction. As such, the pin member 60 is adjacent to the second end 45 of the slot member 35. In this position, when the lid member 1 is set to perform its pressure cooking operations, the clamp members 55 are completely radially translated inwardly to tightly and securely couple the lid member 1 to the vessel. In FIGS. 3 and 5, which are described in greater detail below, the handle 5, dial member 15, and/or plate member 25 has been turned in the counterclockwise direction to put the lid member 1 in a transitional position and air fryer position, respectively.

In the position illustrated in FIG. 1, each of an indicator 65 and a through-hole 70 are also more clearly illustrated. In operation, the indicator is preferably in fluid communication with the inside of the vessel. The indicator is preferably formed as a cylindrical tab that "pops up" when pressure is reached in the vessel. Such pressure may only be produced in the vessel when the lid member 1 works with the vessel to carry out its pressure cooking function. The through-hole 70 is preferably provided in the clamp member 55, and the indicator 65 is preferably mounted below the clamp member 55. When the lid member 1 and the vessel are in the pressure-cooking mode, with the handle 5 turned in the completely clockwise direction, and the clamp members 55 drawn inwardly, the indicator 65 may protrude through the through-hole 70 when pressure is reached in the vessel. When in a mode other than pressure cooking mode, the indicator 65 is preferably trapped beneath the clamp member 55.

Figure 2:
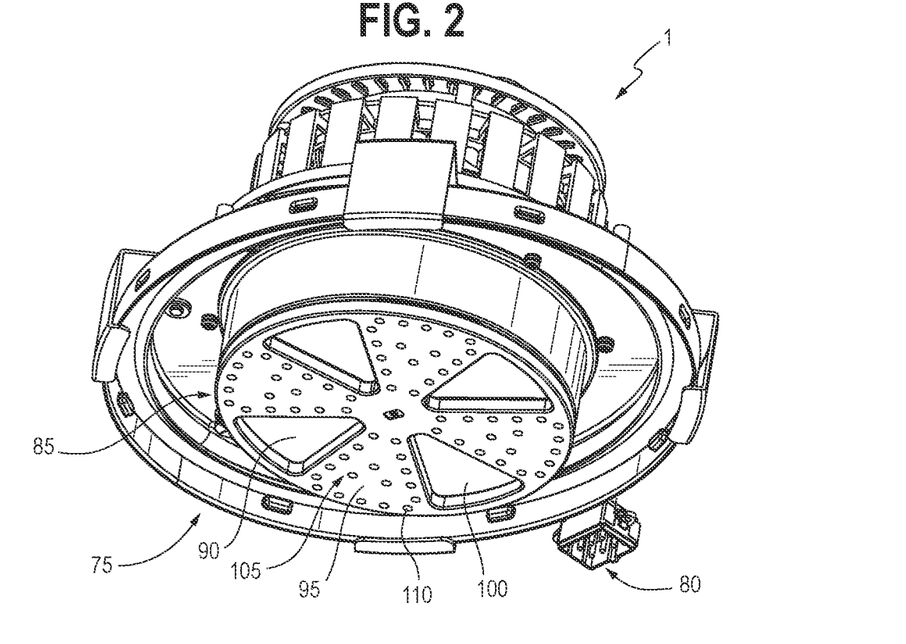
FIG. 2 is a bottom perspective view of the lid of FIG. 1.

FIG. 2 illustrates an underside 75 of the lid member 1 when it is in the pressure cooking position illustrated in FIG. 1 and described above. As illustrated in FIG. 2, when the lid member 1 is in its pressure cooking position, all of the clamp members 55 are radially drawn inwardly to secure the clamp members 55 to the vessel, as described above. FIG. 2 also illustrates an electrical connector member 80 that may mate with electronics of the vessel to power the lid member 1 and its various functions. In alternative embodiments, other known or foreseeable electronic components may be used to power the lid member 1.

As one skilled in the art can appreciate, in order for a lid such as the lid member 1 and a vessel to carry out pressure cooking operations, the vessel should be air tight. As such, in addition to the lid member 1 being securely coupled to the vessel via the clamp members 55, communication between the vessel and the environment must be eliminated. To do so during the pressure cooking process, an internal sealing mechanism 85 may be used. Generally, the internal sealing mechanism 85 may comprise a plurality of panel members 90 in mechanical connection with the handle 5 and a sealing plate 95. The sealing plate 95 preferably includes a plurality of sealing apertures 100 that may be selectively covered by the panel members 90 (as illustrated in FIG. 2) when the lid member 1 is in its pressure cooking operation to keep the vessel airtight.

Figure 6:
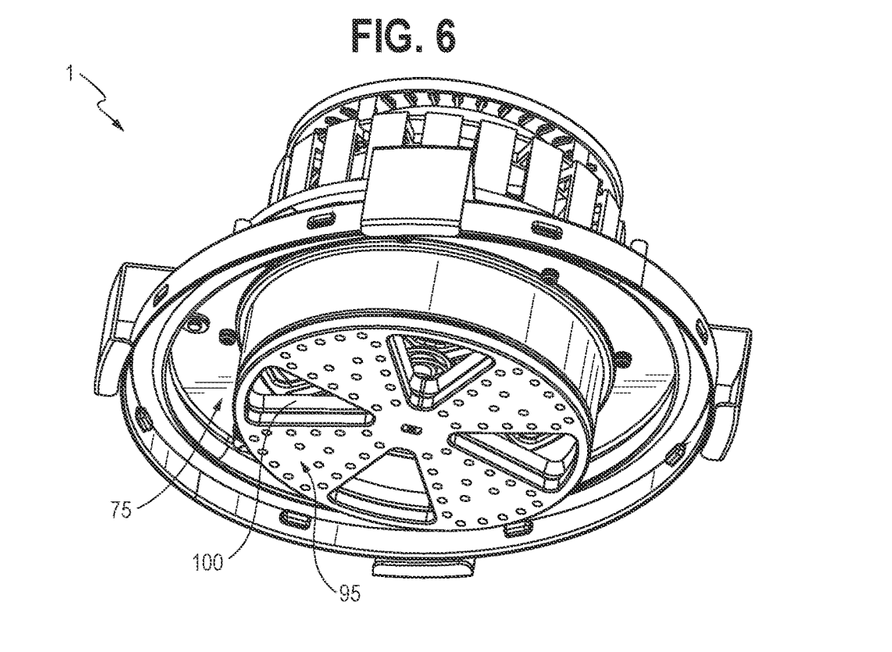
FIG. 6 is a bottom perspective view of the lid of FIGS. 1-5 in the third position.
Figure 7:
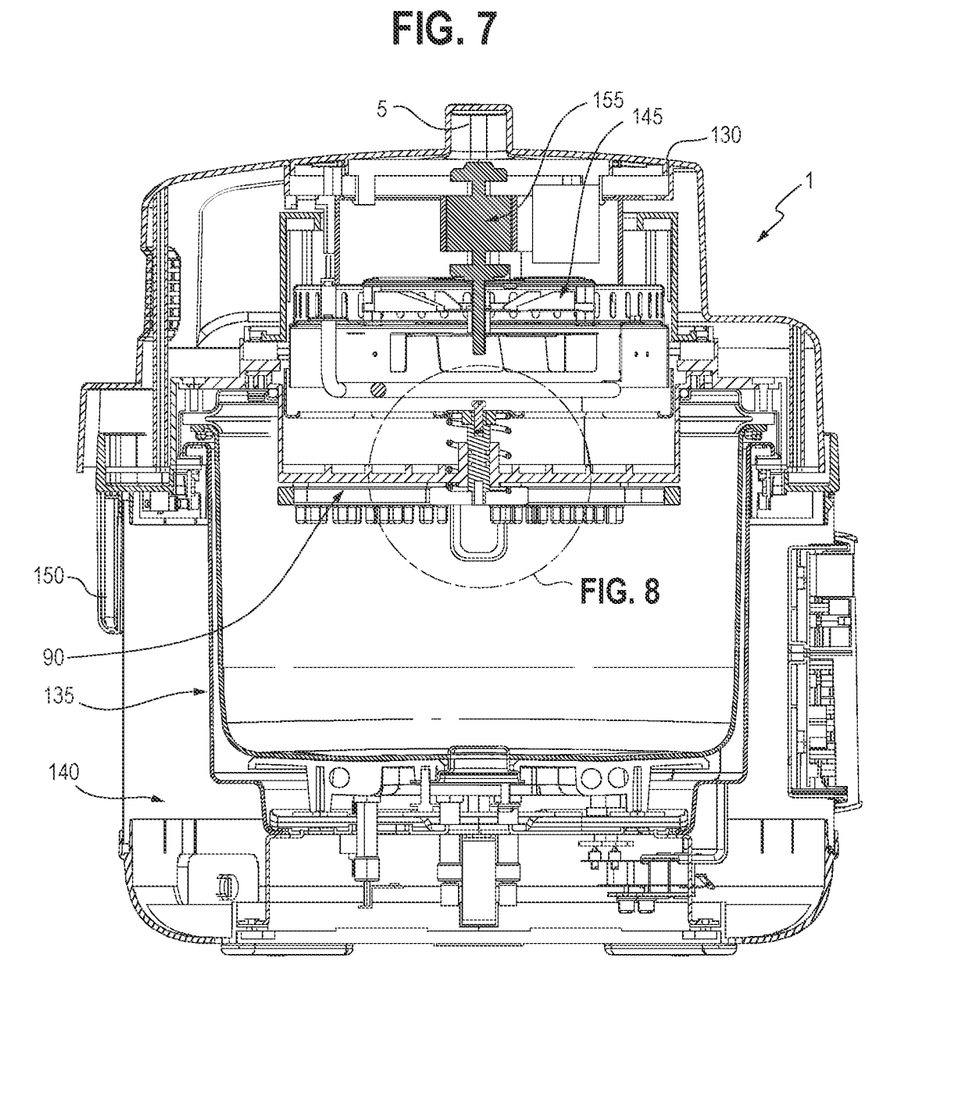
FIG. 7 is a cross-section view of the lid of FIGS. 1-6 and a vessel associated therewith.

As illustrated and described in reference to FIG. 7, the sealing plat 95 is preferably in mechanical connection with the handle 5, for example via a shaft (though any transmission means are foreseeable). The shaft may preferably be upwardly biased by a spring so that without interference by a user, the sealing plate 95 may "auto-locate" to cover its sealing apertures 100 with the plurality of panel members 90. When a user wishes to transition the lid member 1 to an air frying position, the sealing plate 95 may be manipulated as described hereinbelow and illustrated in FIGS. 4 and 6 to dislocate the panel members 90 from its sealing apertures 100 and provide communication between the vessel and the environment via the sealing apertures 100. However, as shown in FIG. 2, when the lid member 1 is in its pressure cooking position, the panel members 90 preferably completely fill and block the apertures 100 to keep the vessel airtight.

A lower face 105 of the sealing plate 95 may be provided with a plurality of nub members 110. The nub members 110 may be small cylindrical projections that extend downwardly from the lower face 105. The nub members 110 may be useful for molding purposes, but are not a critical part of the lid member 1 and may be omitted in certain embodiments.

Turning to FIG. 3, the lid member 1 is shown in a transitional phase between its pressure cooking and air frying positions. More particularly, in FIG. 3, the handle 5 is shown as having been rotated at least partially in the counterclockwise direction. As illustrated, when the handle 5 is rotated in the counterclockwise direction, the plate member 25 with which it is mechanically connected is similarly rotated in the counterclockwise direction. Slot members 35 of the plate member 25 similarly rotate in the counterclockwise direction. As the slot members 35 rotate, due to the curvature of the slot members from their first end 40 to their second end 45, an outward force may be applied on the pin members 60 of the clamp members 55. When such an outward force is applied to the pin members 60, that same force is translated to the clamp members 55. The clamp members 55 thus are translated radially outwardly to at least partially release the clamp members 55 from the vessel.

As illustrated in FIG. 3, a gap 115 may be provided between a downward extension 120 of the clamp member 55 and an outer rim 125 of the lid member 1. When the gap 115 is present, the lid member 1 may be more easily removed from the vessel. While only one transitional position is illustrated where the pin member 60 is approximately halfway between the first and second ends 40, 45 of the slot member 35, it is illustrative of just one example position.

In operation, the handle 5 and the dial member 15 (and plate member 25) may be rotated to a variety of degrees to place the pin 60 at various positions along the length of the slot members 35. Similarly, the clamp members 55 may be positioned near or farther from the outer circumference 125 of the lid member 1 depending on the position of the pin members 60 within the slot members 35 at a number of locations. As illustrated in FIG. 3, the handle 5 has been rotated such that the clamp members 55 have been radially extended outwardly from the lid member 1. In this position, the clamp member 55 including the through-hole 70 has been sufficiently radially translated outwardly to cover the indicator 65 that was previously illustrated and described in FIG. 1.

Figure 4:
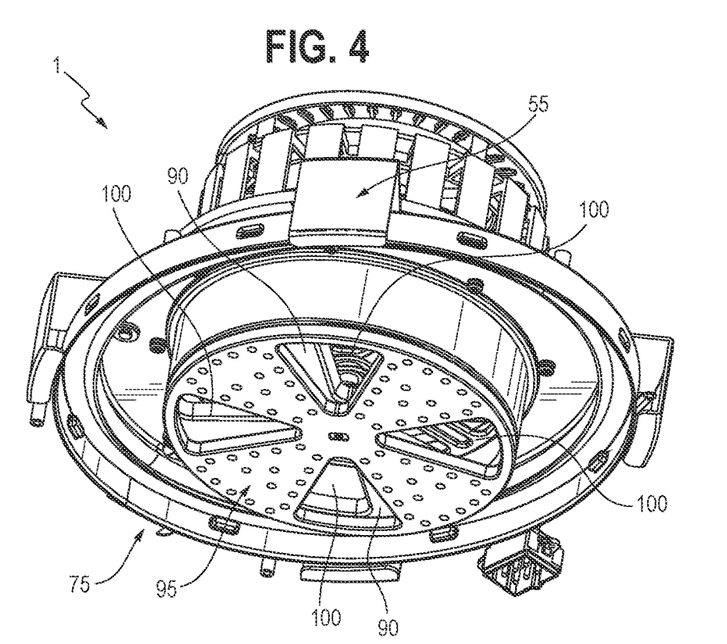
FIG. 4 is a bottom perspective view of the lid of FIGS. 1-3 in the second position.

Turning to FIG. 4, the underside 75 of the lid member 1 is illustrated in greater detail when the lid member 1 is in its transitional position. More particularly, in the transitional position, the handle 5 (or other activation mechanism) has been sufficiently turned as described above to not only cause the clamp members 55 to rotate, but also cause the sealing plate 95 to rotate. With the sealing plate 95 at least partially rotated, a path through at least a portion of the sealing apertures 100 is visible. With the sealing apertures 100 at least somewhat exposed to provide communication between the vessel and the environment via the apertures 100, pressure cooking is no longer possible because the vessel is not airtight.

To transition the sealing plate 95 from a position in which the panel members 90 are seated within the sealing apertures 100 to the position illustrated in FIG. 4, a user may first push downwardly on the handle 5 to overcome the spring bias (described below). Then, with the handle 5 pushed downwardly, a user may rotate the handle 5 and thus the shaft and the sealing plate 95 in the counterclockwise direction to reposition the sealing plate 95.

FIG. 5 illustrates the lid member 1 in its air frying position. In the air frying position, the handle 5 has been rotated farther, or even completely, in the counterclockwise direction. As described above, since the handle 5 has been rotated in the counterclockwise direction, so too have the dial member 15 and/or the plate member 25. Consequently, the slot members 35 have similarly been rotated in the counterclockwise direction. With the handle 5 rotated in the counterclockwise direction, each of the pin members 60 are preferably positioned adjacent the first end 40 of each of the slot members 35. In this position, each slot member 35 is at its greatest distance from the inner edge 50 of the plate member 25. As such, each pin member 60 has been pushed radially outwardly, and if it fully abuts the first end 40, at its maximum radial outward position. Because each pin member 60 has been pushed outwardly, each clamp member 55 similarly has been pushed outwardly such that the size of the gap 115 has increased. This makes the lid member 1 even easier to remove from the vessel, and it further covers the indicator 65.

When the handle 5 is rotated in the manner described above with reference to FIG. 4, the sealing plate 95 may similarly be rotated so that the sealing apertures 100 are substantially clear from and unobstructed by the panel members 90. This position, where the handle 5 is fully rotated in the counterclockwise direction (see FIG. 5) is illustrated in FIG. 6, where the underside 75 of the lid member 1 is more clearly illustrated. With the apertures 100 clear and unobstructed, a fan (illustrated in FIG. 7 and described in association therewith) within the lid member 1 may operate in a known manner to carry out the air frying function.

As described above with reference to FIG. 4, with the handle 5 rotated sufficiently, the spring may again upwardly bias the sealing plate 95 upwardly on an lower side of the panel members 90. To return the lid member 1 to its pressure cooking position illustrated in FIGS. 1 and 2, the handle 5 may simply be rotated in the clockwise direction so that the various mechanisms described above may take place in the reverse direction. As such, the clamp members 55 may radially translate inwardly, and the sealing plate 95 may rotate such that the panel members 90 cover an increasing portion of the sealing apertures 100 until the handle 5 is fully rotated in the clockwise direction. Once it is in that position, as illustrated in FIGS. 1 and 2, the clamp members 55 may be positioned to clamp the lid member 1 to the vessel, and the panel members 90 may be fully seated within the sealing apertures 100.

FIG. 7 illustrates the lid member 1, including a casing 130 to better cover and conceal the various components that make up the lid member 1 as described above. The casing 130 may take on a number of different forms, but in a preferred embodiment, it may be made of a material such as aluminum or plastic, or a combination thereof, and it should sufficiently cover the various components that are housed within the lid member 1.

Also illustrated in FIG. 7 is a vessel 135 that may be used with the lid member 1 to perform the pressure cooking or air frying functions described above. The illustrated vessel 135 is cylindrical in shape, but in other embodiments, it may take on a number of different shapes including oval, rectangular, or other foreseeable shapes. In any case, the vessel 135 should be configured so that the clamp members 55 of the lid member 1 may be releasably attachable to the vessel 135. The vessel 135 may be positioned and located within a casing 140 that may include a number of components used to perform the pressure cooking or air frying functions of the lid member 1 in combination with the vessel 135. For example, the casing 140 may include a control panel for controlling the functions of the lid member 1 via, for example, the electrical connector member 80, a heating element, and other known or foreseeable components necessary to carry out the functions of the lid member 1 and the vessel 135.

Furthermore, like lid members and vessels known in the art, the lid member 1 and the vessel 135 may include components that help to carry out the pressure cooking or air frying functions of the lid member 1 and the vessel 135. For example, as illustrated in FIG. 7, the lid member 1 may include a fan member 145 that may, in a convection-like manner, blow air heated by a heating element in the lid into the vessel 135 when the lid member 1 is in its air fryer mode. Further, the lid member 1 may be associated with a releasably attachable drip container 150 that is able to catch condensation and other products of pressure or other cooking therein. Other known or foreseeable components that help the lid member 1 and/or the vessel 135 or its casing 140 to carry out the pressure cooking or the air frying functions may be contained therein.

Along a central portion of the lid member 1, a shaft 155 is preferably provided that connects the handle 5 to the sealing plate 95. As such, when the handle 5 is rotated, so too is the shaft 155 and the sealing plate 95 associated therewith. Similarly, when the handle 5 is pushed downwardly, the shaft 155 and the sealing plate 95 is translated downwardly, and when the handle 5 is translated upwardly, the sealing plate 95 is translated upwardly for the same reasons.

Figure 8:
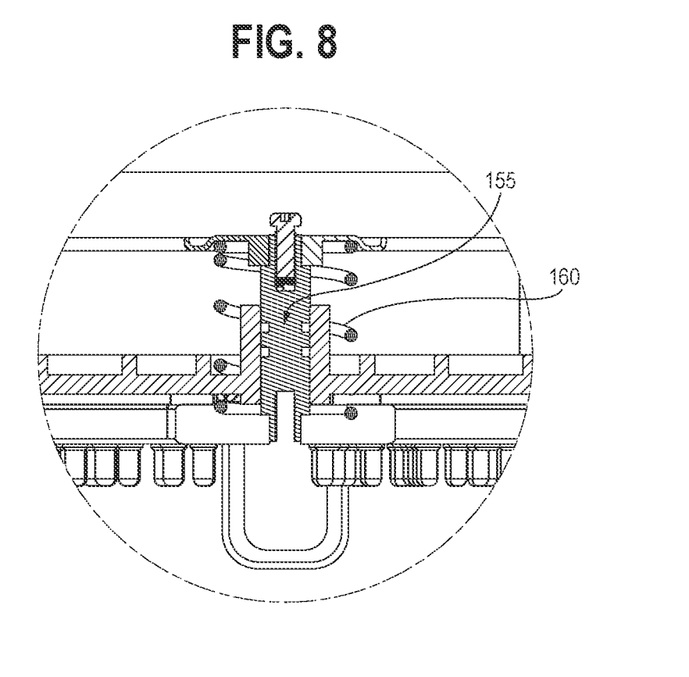
FIG. 8 is an enlarged view of the cross-section view of FIG. 7.

As illustrated in greater detail in FIG. 8, the shaft 155 is preferably provided with a spring member 160 that circumscribes the shaft 155. The spring member 160 preferably exerts a biasing force so that without other outside interference, the sealing plate 95 is biased upwardly, and depending on the position of the handle 5, biased so as to seat the panel members 40 within the sealing apertures 100. Thus, to transition the lid member 1 from its pressure cooking function, where the panel members 90 are seated within the sealing apertures 100, a user must not only rotate the handle 5, but also first push downwardly on the handle 5 so as to overcome the force of the spring 160 to drop the sealing plate 95 down.

Sensors may also be located in the lid member 1 or the vessel 135 that are able to detect when the lid member 1 is in the pressure cooking or air frying mode. The sensors may be in communication with a microcontroller that may instruct the lid to carry out particular functions associated with pressure cooking or air frying, depending on the position of the handle, user input, or both.

In an alternative embodiment, the lid member 1 may be reconfigured to be a simplified component. More particularly, the lid member 1 may be adapted for an appliance that may not have a pressure cooking mode, but does have an air frying mode and at least one other conductive cooking (e.g., slow cook, warming) mode. The alternatively constructed appliance, which is not illustrated in its entirety, also only includes one lid, but the lid may not form an airtight seal with vessel when it is not used as a pressure cooker.

The simplified appliance preferably includes a cover member 165 (illustrated in FIGS. 9-12) that is fixedly attached to an underside of the lid 1. As non-limiting examples, the cover member 165 may be bolted or welded to the underside of the lid 1, and is not removeable therefrom.

The cover member 165 may include each of a first cover portion 170 and a second cover portion 175. In the illustrated embodiment, the first cover portion 170 may be fixedly attached to an underside of the lid member 1 via bolt holes 180 (see FIGS. 10 and 12). The first cover portion 175 is preferably attached to the underside of the lid member 1 such that it is adjacent a fan and heating element (not illustrated) used to blow air into the vessel 135 when the appliance is in its air-frying or a convection mode. A cavity 185 is preferably provided in the first cover portion 170 in which the fan and heating element are housed.

The first cover portion 170 preferably includes apertures 190 (see FIGS. 10 and 12) that allow for air communication between the vessel 135 and the fan when the appliance is in air frying (or convection) mode. In the embodiment illustrated in FIGS. 9-12, the first cover portion 170 includes four apertures 190.

Figure 9:
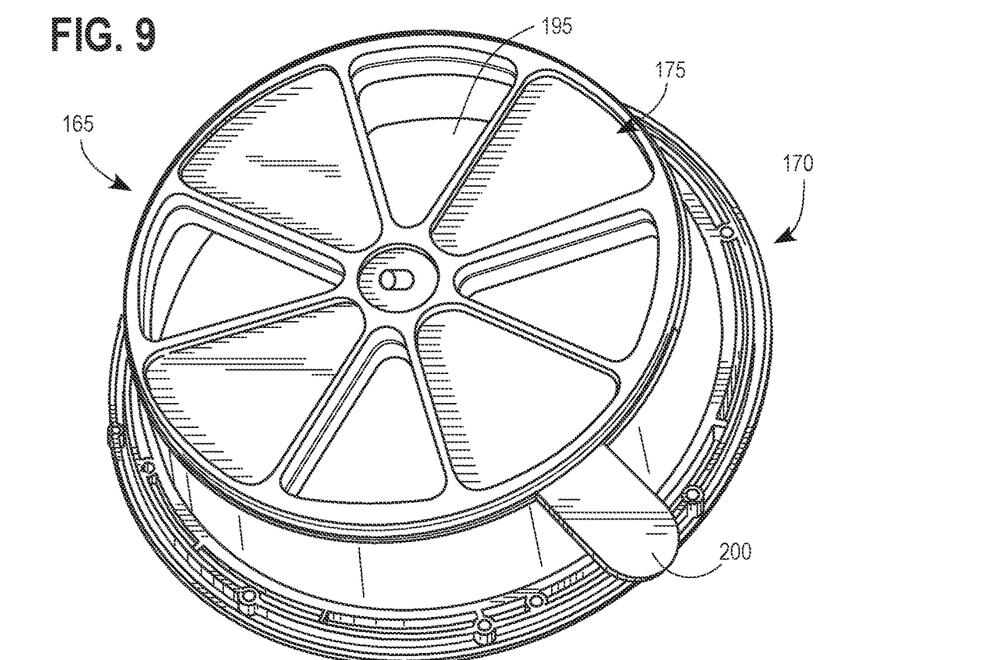
FIG. 9 is a bottom perspective view of a cover that may be used in an alternatively constructed lid in a first position.
Figure 10:
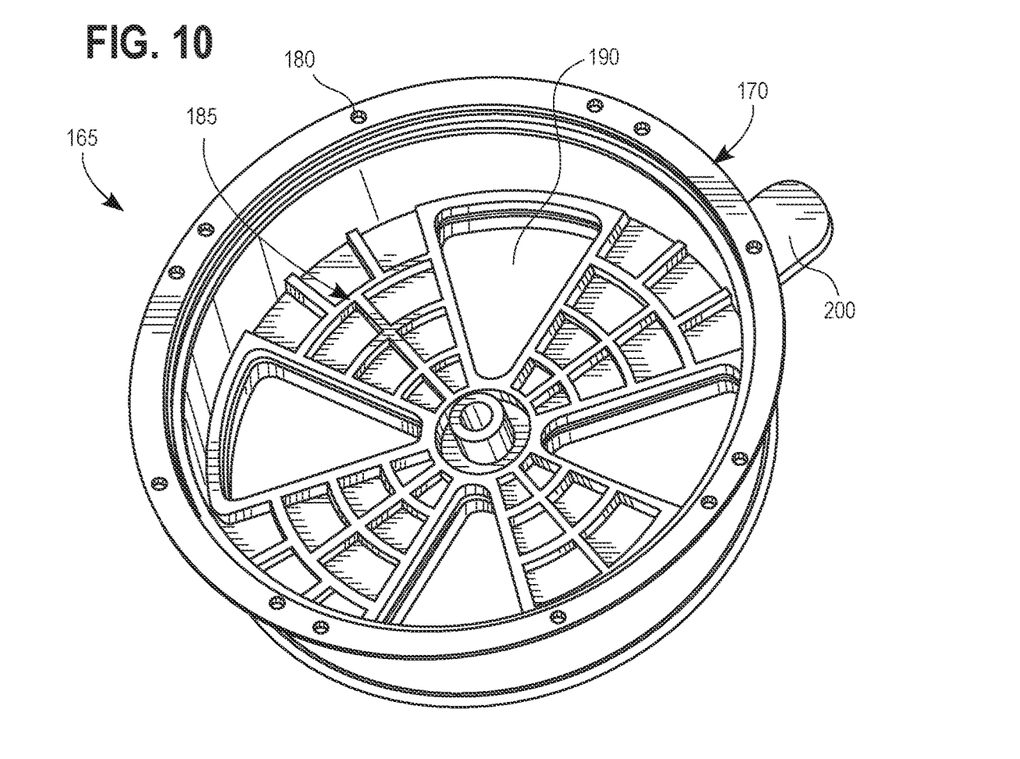
FIG. 10 is a top perspective view of the cover of FIG. 9 in the first position.

The second cover portion 175 is preferably coupled to the first cover portion 170 such that it is movable (preferably rotatable) relative to the first cover portion 170. The second cover portion 175 preferably includes apertures 195 (see FIGS. 9 and 11) that are substantially the same size and shape as the apertures 190 of the first cover portion 170. The cover portions 170, 175 also preferably have the same number of apertures 190, 195 as one another (in this case, four). As illustrated in FIGS. 9 and 10, the apertures 190, 195 are substantially wedge- or triangle-shaped. The apertures 190, 195 may substantially extend from a center area to an outer circumference of the cover portions 170, 175, respectively. In the illustrated embodiments, the apertures 190, 195 increase in size as they approach the outer circumference of the cover portions 170, 175 to form the wedge shape. Further, as illustrated in FIGS. 9 and 10, it will be understood by a person of skill in the art that the spaces between the apertures 190, 195 in the cover portions 170, 175 occupy slightly more than 50% of the space to allow for proper closing off of the apertures 190, 195. As such, the apertures 190, 195 make up approximately 50% of the surface area of the cover portions 170, 175, respectively, with the approximation accounting for the difference in the slightly larger size of the spaces between the apertures 190, 195 versus the apertures 190, 195 themselves. The second cover portion 175 also includes an activation member extending outwardly from its outer circumference that helps a user facilitate rotation of the second cover portion 175 relative to the first cover portion 170. In the illustrated embodiment, the activation member is a tab member 200, though other known or foreseeable activation members are envisioned herein.

When a user wishes to operate the appliance in its air frying mode, there should be air communication between the fan and heating element of the lid 165 and the contents of the vessel 135. As such, the apertures 190, 195 should be aligned with one another so that air may pass therethrough. To align the apertures 190, 195 to allow air to pass through them, a user may simply use the tab member 200 to rotate the second cover portion 175 until the apertures 190, 195 are substantially aligned, as illustrated in FIGS. 9 and 10.

Figure 11:
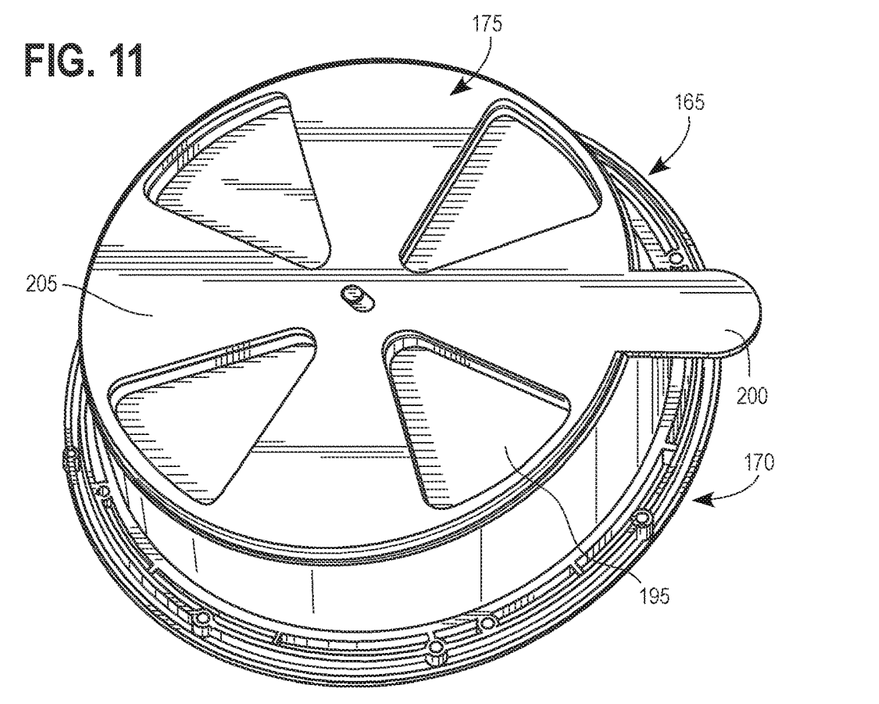
FIG. 11 is a bottom perspective view of a cover that may be used in an alternatively constructed lid in a second position.
Figure 12:
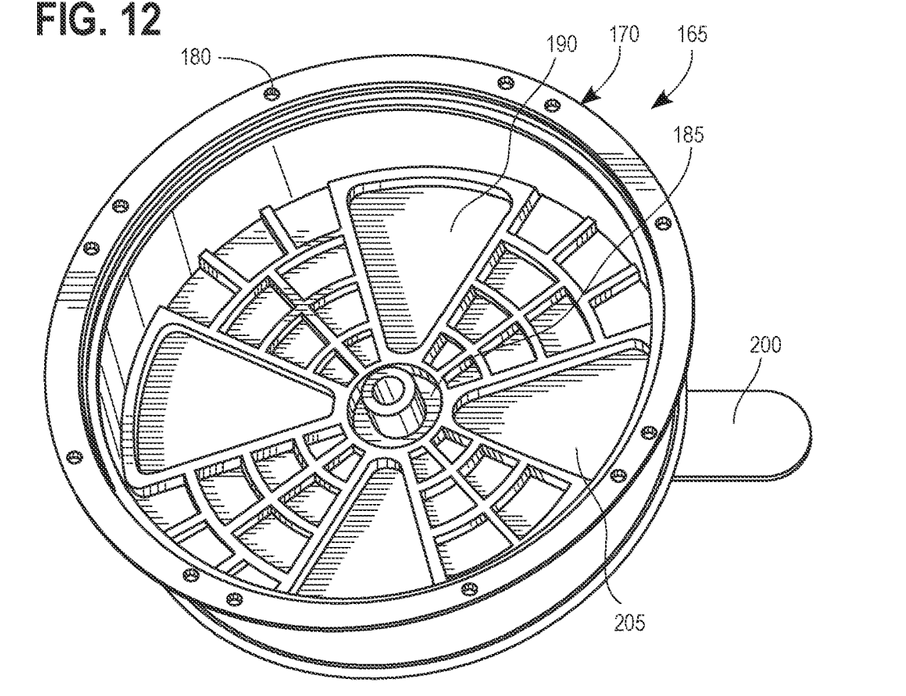
FIG. 12 is a top perspective view of the cover of FIG. 11 in the second position.

Turning to FIGS. 11 and 12, when a user wishes to use the appliance in a conductive cooking mode, he or she may use the tab member 200 to manually rotate the second cover portion 175. When the second cover portion 175 is sufficiently rotated, a surface 205 of the second cover portion 175 that does not include the apertures 195 may cover the apertures 190 in the first cover portion 170. This substantially blocks communication between the air fryer fan and the vessel 135. Moreover, the second cover portion 175 and its surface 205 effectively block foodstuffs being cooked in the vessel 135 from contacting the fan or otherwise entering the lid member 1 to cause damage to its interior.

Because of the simplicity that the cover member 165 provides to the appliance, certain components used when the appliance has a pressure-cooking function are not necessary. For example, the appliance using the cover member 165 does not require an exterior handle or a mechanism that creates an airtight seal between the lid member 165 and the vessel 135.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A cover member attached to an underside of a lid member for an appliance capable of conductive cooking and air frying, the cover member comprising:
   a first cover portion fixedly attached to the underside of the lid member, the first cover portion including one or more apertures that extend from a center area of the first cover portion to an outer circumference of the first cover portion;
   a second cover portion rotatably coupled to the first cover portion, the second cover portion including one or more apertures that extend from a center area of the second cover portion to an outer circumference of the second cover portion;
   wherein:
      when the second cover portion is rotated to a first position, the one or more apertures of the first cover portion and the one or more apertures of the second cover portion are at least partially aligned with one another;
      when the second cover portion is rotated to a second position, the one or more apertures of the first cover portion are covered by a surface of the second cover portion; and
      when the cover member is attached to the lid member, a fan is between the cover member and the lid member.

2. The cover member of claim 1, wherein the second cover portion includes an activation member extending therefrom that aids in rotating the second cover portion.

3. The cover member of claim 2, wherein the activation member is a tab member.

4. The cover member of claim 1, wherein the one or more apertures of the first cover portion and the one or more apertures of the second cover portion are the same shape.

5. The cover member of claim 1, wherein the one or more apertures of the first cover portion and the one or more apertures of the second cover portion are the same size.

6. The cover member of claim 1, wherein the there are four apertures on the first cover portion and four apertures on the second cover portion.

7. The cover member of claim 1, wherein the one or more apertures of the first cover portion and the one or more apertures of the second cover portion make up approximately 50% of a surface area of the first cover portion and the second cover portion, respectively.

8. The cover member of claim 1, wherein first position is for air frying.

9. The cover member of claim 1, wherein second position is for conductive cooking.

10. A lid system for an appliance capable of conductive cooking and air frying, the lid system comprising:
    a fan;
    a cover member; and
    a lid member comprising:
       a first cover portion fixedly attached to the underside of the lid member, the first cover portion including one or more wedge-shaped apertures;
       a second cover portion rotatably coupled to the first cover portion, the second cover portion including one or more wedge-shaped apertures;
       wherein when the second cover portion is rotated to an air frying position, the one or more apertures of the first cover portion and the one or more apertures of the second cover portion are at least partially aligned with one another; and
       when the cover member is attached to the lid member, the fan is between the cover member and the lid member.

11. The lid system of claim 10, wherein when the second cover portion is rotated to a conductive cooking position, the one or more apertures of the first cover portion are covered by a surface of the second cover portion.

12. The lid system of claim 10, wherein the second cover portion includes an activation member extending therefrom that aids in rotating the second cover portion.

13. The lid system of claim 12, wherein the activation member is a tab member.

14. The lid system of claim 10, wherein the one or more apertures of the first cover portion and the one or more apertures of the second cover portion are the same shape.

15. The lid system of claim 10, wherein the one or more apertures of the first cover portion and the one or more apertures of the second cover portion are the same size.

16. The lid system of claim 10, wherein the there are four apertures on the first cover portion and four apertures on the second cover portion.

17. The lid system of claim 10, wherein the one or more apertures of the first cover portion and the one or more apertures of the second cover portion make up approximately 50% of a surface area of the first cover portion and the second cover portion, respectively.

18. The lid system of claim 10, wherein the first cover portion is bolted to the underside of the lid member.

* * * * *